US005562532A

United States Patent [19]
Horst et al.

[11] Patent Number: 5,562,532
[45] Date of Patent: Oct. 8, 1996

[54] CHICKEN TENDER CUTTING MACHINE

[75] Inventors: Sheldon Horst, Lancaster; Eugene Martin, Denver, both of Pa.

[73] Assignee: Foodcraft Equipment Company, Lancaster, Pa.

[21] Appl. No.: 374,141

[22] Filed: Jan. 18, 1995

[51] Int. Cl.⁶ .................................................. A22C 21/00
[52] U.S. Cl. .......................... 452/149; 452/136; 452/165
[58] Field of Search .................................... 452/149, 165, 452/125, 135, 136

[56] References Cited

U.S. PATENT DOCUMENTS

| | | | |
|---|---|---|---|
| 4,669,148 | 6/1987 | Scheier | 452/165 |
| 4,827,570 | 5/1989 | Scheier et al. | 452/136 |
| 4,993,114 | 2/1991 | Meyer et al. | 452/136 |
| 5,123,872 | 6/1992 | Tieleman et al. | 452/149 |
| 5,269,722 | 12/1993 | Diesing et al. | 452/136 |
| 5,312,291 | 5/1994 | van den Nieuwelaar et al. | 452/165 |
| 5,314,374 | 5/1994 | Koch et al. | 452/149 |
| 5,368,520 | 11/1994 | Koch et al. | 452/136 |

*Primary Examiner*—Willis Little
*Attorney, Agent, or Firm*—Shoemaker and Mattare, Ltd.

[57] ABSTRACT

A chicken tender cutting machine includes two relatively moveable carriages supported on the frame above a processing line. The first device includes a knife for making an incision in the tenderloin between the wishbone and the rib cage of the bird to free the upper end of the tenderloin; the second device is supported on the frame downstream of the first device, and has a blunt-tipped instrument which is moved downward between the tenderloin and the rib cage, so that the blunt tip sweeps along the keel to sever the tenderloin's connection to the keel.

11 Claims, 4 Drawing Sheets

5,562,532

CHICKEN TENDER CUTTING MACHINE

BACKGROUND OF THE INVENTION

This invention relates generally to butchering, and more particularly to a chicken tender cutting machine for use with a breast deboner, to permit removal from the rib cage of the tenders along with the breast meat.

One way of removing breast meat from the rib cage is to tear it off by pulling the wings down after the shoulder joints have been cut and the breast muscles have been preliminarily cut in the vicinity of the shoulder. A number of machines have been developed for this function. With proper preparation and pulling direction, all of the pectoralis major, and other muscles, can be removed in one piece, to be sold as boneless breasts. The tenderloins (or "tenders") do not follow the pectorales major in such a process, being only light adhered to them, and being firmly connected to the rib cage near the shoulder and along the keel or sternum.

The tenderloins, which are particularly tasty, are usually cut from the rib cage after the overlying breast meat has been removed. It would, we believe, be desirable to enable packers to remove both the breasts and the tenderloins from the rib cage at one time, both for the sake of efficiency, and to enable the packer to offer boneless breasts including the tenderloins as a single item.

Tenderloins pose special difficulties for automatic butchering, because they are partly covered by the wishbone, and because they are connected for a substantial length along the keel.

SUMMARY OF THE INVENTION

An object of the invention is to automate the process of tenderloin removal from birds.

Another object of the invention is to enable packers to remove tenderloins and breasts from birds at one time.

A further object of the invention is to maximize the quantity of tenderloins removed from the rib cage, while minimizing injury to the tenderloins.

These and other objects are attained by a chicken tender cutting machine including two relatively moveable carriages supported on the frame above a processing line. The first device includes a knife for making an incision in the tenderloin between the wishbone and the rib cage of the bird to free the upper end of the tenderloin; the second device is supported on the frame downstream of the first device, and has a blunt-tipped instrument which is moved downward between the tenderloin and the rib cage, so that the blunt tip sweeps along the keel to sever the tenderloin's connection to the keel.

The mechanisms for driving the two cutting devices are substantially identical. Each is mounted on the top and side of its respective carriage, and includes three pivot connections and air cylinders for effecting two of the three pivoting movements. The third is passive, resisted by a return spring.

Once a bird carcass, supported internally by a fixture, comes to rest beneath either carriage, the air cylinders are activated in sequence to make the intended cuts, then withdraw and return to a raised position.

BRIEF DESCRIPTION OF THE DRAWINGS

In the accompanying drawings.

DESCRIPTION OF THE PREFERRED EMBODIMENT

Figure 1:
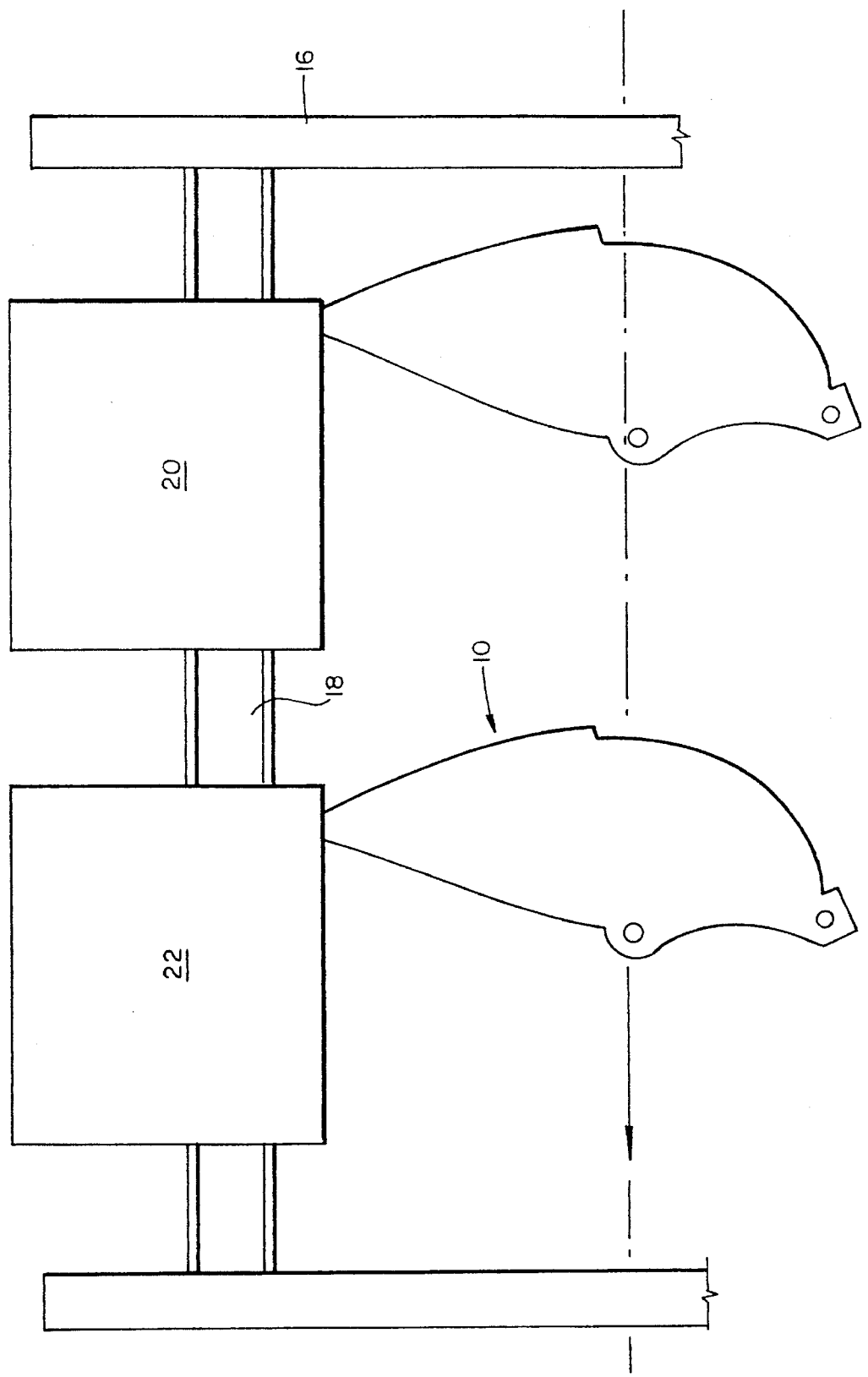
FIG. 1 is a side elevation of a machine embodying the invention, showing major elements in block form.
Figure 2:
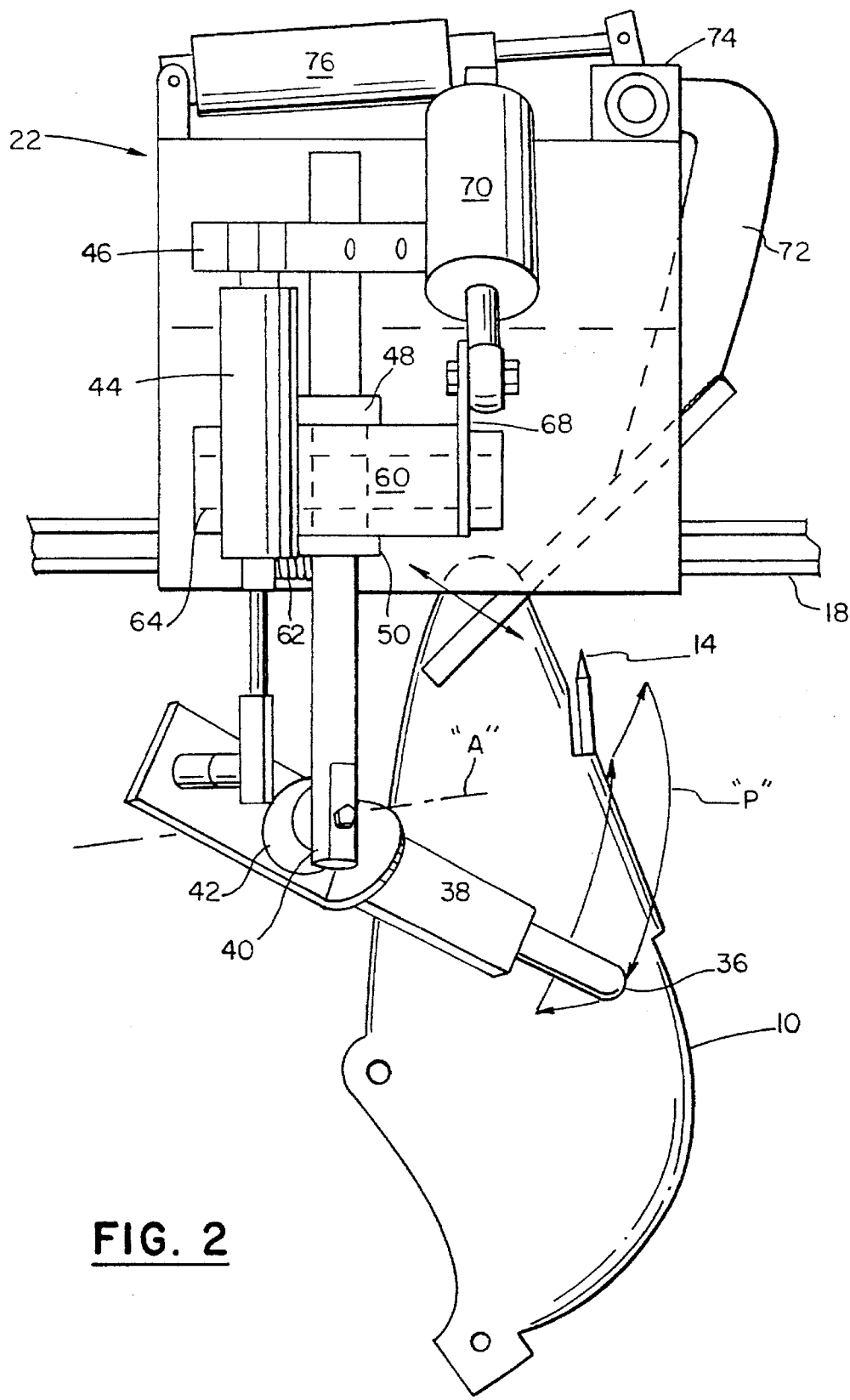
FIG. 2 is an enlarged portion thereof, showing the leftmost cutting mechanism in detail.
Figure 3:
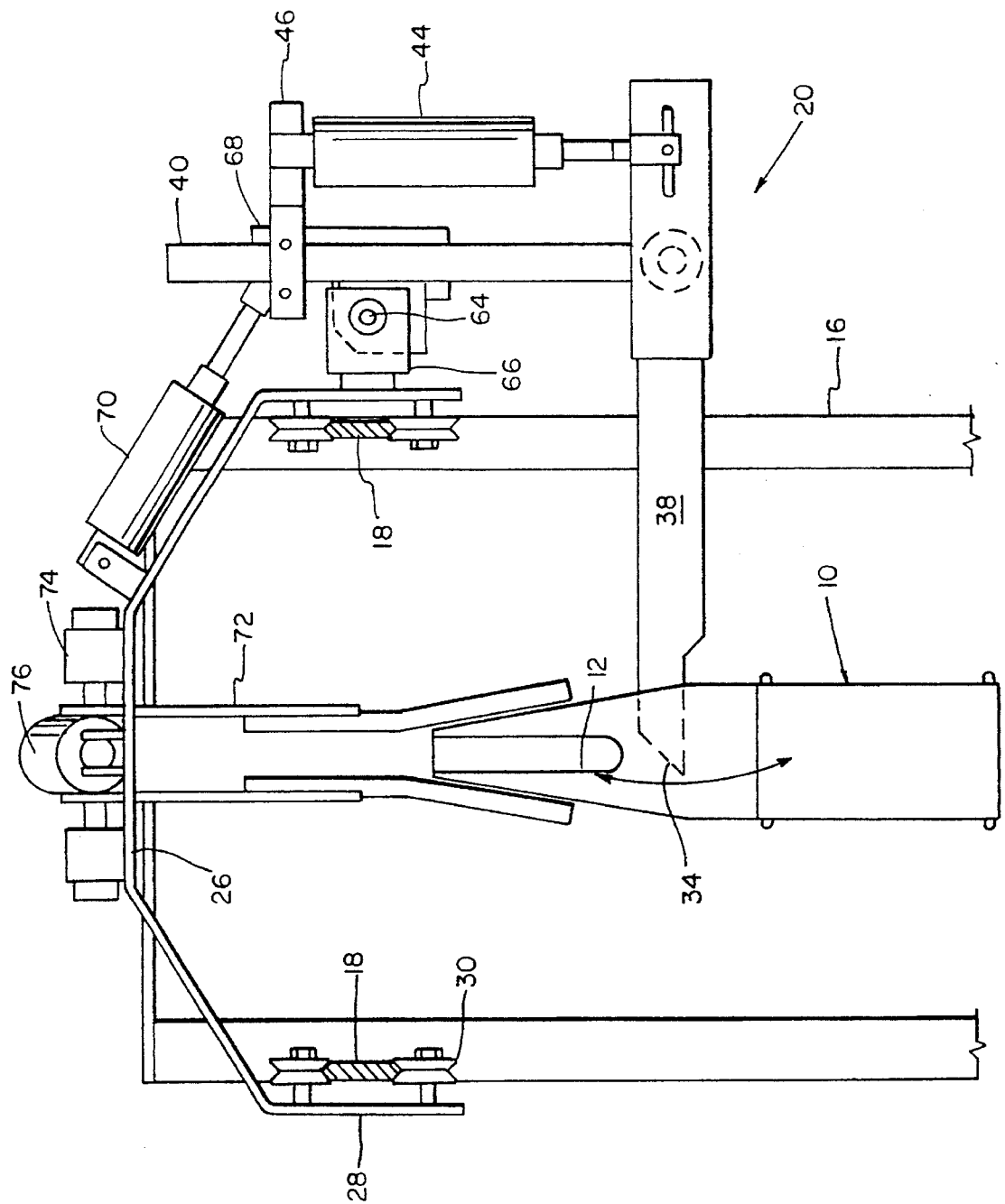
FIG. 3 is an end view, looking in an upstream direction.
Figure 4:
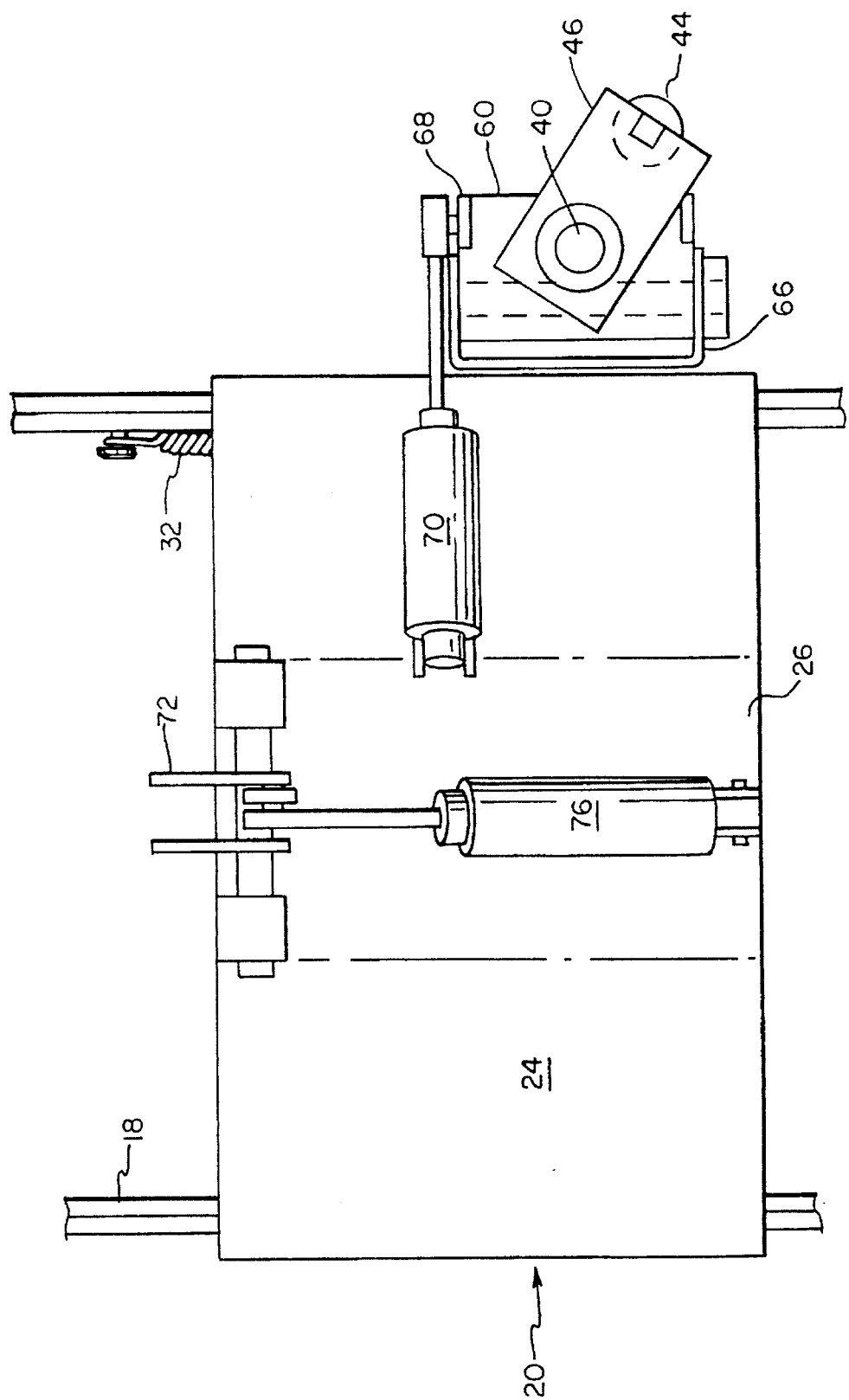
FIG. 4 is a top plan view of the rightmost cutting mechanism shown in FIG. 1.

A chicken tender cutting machine embodying the invention is shown in FIGS. 1–4, mounted above a processing line defined by a chain conveyor which supports an equally spaced series of conical fixtures 10 onto which the upper halves of fowl, which have previously been gutted and halved, have been placed. Each fixture conforms to the inside of a bird's chest cavity, and has a vertical groove 12 on its downstream surface which receives the backbone, and prevents the carcass from rotating. The pin 14 extending from the upstream surface keeps the carcass from being pushed down too far on the fixture. Other details of the fixture are not important to this invention, and it should be understood that while the fixtures may tilt fore and aft elsewhere, they remain upright as they pass through the machine described herein.

The machine frame 16 includes a pair of fixed horizontal rails 18 extending parallel to the conveyor, above and on either side of it. The cross-section of each rail is an irregular hexagon providing ridges top and bottom. The rails support two carriages 20,22, each having a base 24 formed from a metal plate to define a pent-roof shape (see FIG. 3) comprising a top 26 and two sides 28; the open bottom and ends allow the fixtures to carry birds through the volume defined by the base.

The inner surface of each side is provided with four wheels 30 having grooved peripheries that ride along the ridges on the respective rails 18. Total travel of either carriage is physically limited to about an inch and a half, and in practice is only a fraction of that. Each carriage is returned to its rest position, in the upstream direction, by a tension spring 32 (FIG. 4) connected between the base and one of the rails.

The carriages are identical, except for the cutting tools they carry. The tool on the upstream unit 20 (FIG. 3) is a sharp knife 34, which sweeps just under and along the wishbone to free the upper end of the tenderloin, whereas the tool on the downstream unit 22 (FIG. 2) is a blunt-tipped rod 36 which sweeps below the tenderloin and against the keel to sever the tenderloin's attachment along the keel.

Each cutting tool is supported at the free end of an arm 38 which is pivotally connected to the bottom end of a long shaft 40 that is normally vertical. The hinge axis "A" passes along the length of the bolt which secures the arm, and the spacer 42 which stands it off from the long shaft. The outermost end of the arm is pivotally connected to the piston rod of an air cylinder 44. The body of the air cylinder is connected to a bracket 46 clamped to the upper end of the long shaft.

The long shaft cannot move along its length, because of thrust rings 48,50 clamped to the shaft above and below the bearing block 60 through which it passes, but it can rotate over an arc defined by stops (not shown) affixed to the rings. A return spring 62 tends to return the tool in a downstream direction, while allowing it to be deflected in an upstream direction by the contour of the rib cage as the tool is driven downward.

The bearing block 60, preferably made of plastic, acts as a universal joint, as a short shaft 64 passes horizontally through it, on a horizontal axis parallel to the conveyor. A "U"-shaped bracket 66 (FIG. 4) bolted to the side of the carriage base supports the ends of the short shaft. A small plate 68, affixed to one end of the block, acts as a crank arm. Its extremity is connected to the rod of a second air cylinder 70 whose upper end is affixed to tabs welded to the top of the carriage base.

By retracting the second air cylinder 70, the bearing block is pivoted, swinging the tool outward a short distance, away from the fixture, after a downward cutting stroke has been made by retracting the first air cylinder. Thereafter, the air cylinders are extended in sequence, so that the tool tip thus follows the four-sided curved path "P" shown in FIG. 1.

Because the wishbone is so small and close the breast, and because the knife must pass under the wishbone in order to perform its function of scraping along the rib cage to free the upper end of the tenderloin so that the blunt tool can subsequently get under it, it is critical to position the cutting mechanism precisely with respect to the carcass. That is the reason the carriages are allowed to reciprocate lengthwise of the conveyor.

The conveyor is moved intermittently, and is indexed so that the fixtures stop beneath the carriages. As they do, a two-tined clamping fork 72, pivotally mounted on bearings 74 atop the base, is caused to descend by retracting a third air cylinder 76. As one can see from FIG. 2, the distal ends of the tines are parallel to the conical periphery of the fixture, and the descending tines pass just on either side of the fixture (see FIG. 2), pressing down on the scapulae to establish with precision the position of the carcass. The carriage moves as necessary to adapt to the position of the carcass and fixture. Now, the cutting movement described above is initiated. Once the cutting implement is retracted, the conveyor is indexed another cycle.

Other than the nature of the cutting tools, the two cutting mechanisms are the same, with one exception: the stroke of the blunt tool has to be longer, so a longer-stroke driving cylinder 44 is provided on the downstream mechanism.

While the foregoing description and claims below refer to chicken as an intended product, the invention - perhaps scaled up or down—is applicable to turkeys and other fowl, and we do not intend to limit the claims to a particular use.

Since the invention is subject to modifications and variations, it is intended that the foregoing description and the accompanying drawings shall be interpreted as illustrative of only one form of the invention, whose scope is to be measured by the following claims.

We claim:

1. A tenderloin cutting machine for placement above a conveyor having a series of fixtures carrying bird carcasses during butchering, said machine comprising a frame, a first device supported on the frame, said first device comprising a knife for freeing the upper end of the tenderloin by scraping along the rib cage beneath the wishbone and a first mechanism for lowering the knife along an arcuate path to perform the scraping, and a second device supported on the frame downstream of the first device, said second device comprising a cylindrical rod and a second mechanism for moving the rod about a first pivot axis, downward along an arcuate path between the tenderloin and the rib cage, said rod having a blunt tip for sweeping down along the keel and severing the tenderloin's connection to the keel from beneath, said second mechanism being mounted for pivoting movement about an approximately vertical axis, so that said arcuate path can follow the rib cage, and wherein each said mechanism comprises a first member pivotally connected to said base for movement about a first, horizontal axis, a second member pivotally connected to said first member for movement about a second axis perpendicular to said first axis, and a third member pivotally connected to said second member, for movement about a third axis parallel to neither of said first and second axes.

2. The invention of claim 1, wherein each of said first and second devices comprises a carriage supported on the frame, the carriage having a base and a mechanism affixed to the base for moving the respective cutting device.

3. The invention of claim 2, wherein said moving means comprises independently operable linear motors.

4. The invention of claim 3, wherein each of said linear motors is a pneumatic cylinder, and further comprising means for activating said cylinders in a predetermined sequence.

5. The invention of claim 2, wherein the cutting tool can pivot about said second axis between a pair of stops, one of which defines a rest position, and further comprising a biasing spring tending to return the tool to the rest position, but permitting the tool to depart from the rest position in order to follow the rib cage contour.

6. The invention of claim 4, wherein said sequence comprises first, causing the second cylinder to lower the tool from an initial position above a bird downward along the rib cage a predetermined distance, second, causing the first cylinder to retract the tool away from the rib cage, third, causing the second cylinder to raise the tool, without contacting the rib cage, and fourth, causing the first cylinder to return the tool to its initial position.

7. The invention of claim 6, further comprising a pair of stops for limiting pivoting movement of the tool about the second axis, one of said stops defining a rest position, and further comprising a biasing spring tending to return the tool to the rest position, but permitting the tool to depart from the rest position in order to follow the rib cage contour as the tool is lowered.

8. The invention of claim 2, wherein the frame comprises at least one rail extending parallel to the conveyor, and each of said carriage bases comprises means which run on the rail, thus permitting each carriage to move lengthwise of the rail independently of the frame and independently of the other carriage.

9. The invention of claim 8, wherein each carriage comprises a return spring tending to return the carriage to a rest position.

10. The invention of claim 8, further comprising, on each carriage, a carcass clamp including a two-tined clamping fork pivotally mounted on a horizontal transverse pivot on the base, and a linear motor affixed to the base at one end and to the fork at the other end for alternately retracting the fork and driving it downward to engage the scapula of the carcass while the carcass is at rest, while said carriage moves against its spring bias, if necessary, to precisely locate the carcass for cutting.

11. The invention of claim 8, wherein the number of said rails is two, each said carriage base comprises a metal plate deformed to define a volume open at the ends and bottom, but closed at the top and sides, and the means which run on the rails are wheels mounted on axles affixed to the sides of the base astride the rails.

\* \* \* \* \*